US012738607B2

(12) United States Patent
Pytlik et al.

(10) Patent No.: US 12,738,607 B2
(45) Date of Patent: Sep. 15, 2026

(54) ENERGY STORAGE CELL AND PRODUCTION METHOD

(71) Applicant: VARTA MICROBATTERY GMBH, Ellwangen Jagst (DE)

(72) Inventors: Edward Pytlik, Ellwangen (DE); David Ensling, Ellwangen (DE)

(73) Assignee: VARTA MICROBATTERY GMBH, Ellwangen Jagst (DE)

(*) Notice: Subject to any disclaimer, the term of this patent is extended or adjusted under 35 U.S.C. 154(b) by 701 days.

(21) Appl. No.: 18/020,452

(22) PCT Filed: Aug. 11, 2021

(86) PCT No.: PCT/EP2021/072428
§ 371 (c)(1),
(2) Date: Feb. 9, 2023

(87) PCT Pub. No.: WO2022/034156
PCT Pub. Date: Feb. 17, 2022

(65) Prior Publication Data

US 2023/0291080 A1 Sep. 14, 2023

(30) Foreign Application Priority Data

Aug. 11, 2020 (EP) .................................... 20190528

(51) Int. Cl.
*H01M 50/538* (2021.01)
*H01M 4/66* (2006.01)
(Continued)

(52) U.S. Cl.
CPC ......... *H01M 50/538* (2021.01); *H01M 4/661* (2013.01); *H01M 4/75* (2013.01);
(Continued)

(58) Field of Classification Search
CPC ............. H01M 50/538; H01M 50/181; H01M 50/107; H01M 50/40
See application file for complete search history.

(56) References Cited

U.S. PATENT DOCUMENTS 2,830,110 A * 4/1958 Kirkman ................. H01M 6/46 429/246
5,736,270 A * 4/1998 Suzuki ................ H01M 50/538 429/94

(Continued)

FOREIGN PATENT DOCUMENTS

CN 201975432 U 9/2011
DE 10031453 A1 2/2001

(Continued)

OTHER PUBLICATIONS

International Electrotechnical Commission, "IEC/EN 61951-1," Feb. 2023, pp. 1-9, Switzerland.

(Continued)

*Primary Examiner* — Kenneth J Douyette
(74) *Attorney, Agent, or Firm* — Leydig, Voit & Mayer, Ltd.

(57) ABSTRACT

A lithium-ion cell includes a housing comprising a metallic tubular housing part made of aluminum or an aluminum alloy with a terminal circular opening. The cell further includes a contact element that closes the terminal circular opening of the tubular housing part, the contact element comprising a metal disk, a contact sheet metal member, a metal pole pin and an insulator. In addition, the cell includes an electrode-separator assembly having an anode, a cathode, and a separator with the sequence anode/separator/cathode. The electrode-separator assembly is in the form of a cylindrical winding with two terminal end faces and a winding shell located therebetween. The electrode-separator assem- (Continued)

A

B bly is disposed in the winding and is axially aligned so that the winding shell abuts an inside of the tubular housing part.

13 Claims, 5 Drawing Sheets

(51) Int. Cl.

| | |
|---|---|
| ***H01M 4/75*** | (2006.01) |
| ***H01M 10/04*** | (2006.01) |
| ***H01M 10/0525*** | (2010.01) |
| ***H01M 10/0587*** | (2010.01) |
| ***H01M 50/107*** | (2021.01) |
| ***H01M 50/109*** | (2021.01) |
| ***H01M 50/119*** | (2021.01) |
| ***H01M 50/152*** | (2021.01) |
| ***H01M 50/153*** | (2021.01) |
| ***H01M 50/169*** | (2021.01) |
| ***H01M 50/179*** | (2021.01) |
| ***H01M 50/181*** | (2021.01) |
| ***H01M 50/559*** | (2021.01) |
| ***H01M 50/562*** | (2021.01) |

(52) U.S. Cl.

CPC .................. *H01M 10/0422* (2013.01); *H01M 10/0427* (2013.01); *H01M 10/049* (2013.01); *H01M 10/0525* (2013.01); *H01M 10/0587* (2013.01); *H01M 50/107* (2021.01); *H01M 50/109* (2021.01); *H01M 50/119* (2021.01); *H01M 50/152* (2021.01); *H01M 50/153* (2021.01); *H01M 50/169* (2021.01); *H01M 50/179* (2021.01); *H01M 50/181* (2021.01); *H01M 50/559* (2021.01); *H01M 50/562* (2021.01)

(56) References Cited

U.S. PATENT DOCUMENTS

| | | | | | |
|---|---|---|---|---|---|
| 6,143,442 | A * | 11/2000 | Takahashi | ......... | H01M 50/3425 429/73 |
| 6,432,574 | B1 | 8/2002 | Suzuki | | |
| 2009/0136831 | A1 * | 5/2009 | Wyser | .................. | H01M 50/24 429/94 |
| 2011/0117427 | A1 | 5/2011 | Lin et al. | | |
| 2016/0181619 | A1 * | 6/2016 | Hashimoto | ........... | H01M 4/628 429/61 |

FOREIGN PATENT DOCUMENTS

| | | | |
|---|---|---|---|
| JP | H1031996 | A | 2/1998 |
| JP | 2004119330 | A | 4/2004 |
| KR | 200262297 | Y1 | 3/2002 |
| KR | 20120123769 | A | 11/2012 |
| KR | 20160051329 | A | 5/2016 |
| KR | 20200007559 | A | 1/2020 |
| TW | 559342 | U | 10/2003 |
| WO | WO 2005109551 | A1 | 11/2005 |
| WO | WO 2015015274 | A1 | 2/2015 |
| WO | WO 2017215900 | A1 | 12/2017 |

OTHER PUBLICATIONS

International Electrotechnical Commission, "IEC/EN 60622," Oct. 2002, pp. 1-18, Switzerland.

International Electrotechnical Commission, "IEC/EN 61951-2," Mar. 2017, pp. 1-48, Switzerland.

International Electrotechnical Commission, "IEC/EN 61960," Feb. 2017, pp. 1-50, Switzerland.

International Electrotechnical Commission, "IEC/EN 61056-1," Feb. 2012, pp. 1-23, Switzerland.

* cited by examiner

ENERGY STORAGE CELL AND PRODUCTION METHOD

CROSS REFERENCE TO RELATED APPLICATIONS

This application is a U.S. National Phase application under 35 U.S.C. § 371 of International Application No. PCT/EP2021/072428, filed on Aug. 11, 2021, and claims benefit to European Patent Application No. EP 20190528.8, filed on Aug. 11, 2020. The International Application was published in German on Feb. 17, 2022 as WO 2022/034156 under PCT Article 21(2).

FIELD

The disclosure relates to an energy storage cell comprising an electrode-separator assembly.

BACKGROUND

Electrochemical cells can convert stored chemical energy into electrical energy by virtue of a redox-reaction. They generally comprise a positive and a negative electrode separated by a separator. During a discharge, electrons are released at the negative electrode as a result of an oxidation process. This results in an electron current that can be drawn off by an external electrical consumer, for which the electrochemical cell serves as an energy supplier. At the same time, an ion current corresponding to the electrode reaction occurs within the cell. This ion current crosses the separator and is ensured by an ion-conducting electrolyte.

If the discharge is reversible, i.e. if it is possible to reverse the conversion of chemical energy into electrical energy that took place during the discharge and thus to charge the cell again, this is said to be a secondary cell. The designation of the negative electrode as anode and the designation of the positive electrode as cathode, which is generally used for secondary cells, refers to the discharge function of the electrochemical cell.

Secondary lithium-ion cells are used for many applications today because they can provide high currents and are characterized by a comparatively high energy density. They are based on the use of lithium, which can migrate between the electrodes of the cell in the form of ions. The negative electrode and the positive electrode of a lithium-ion cell are generally formed by so-called composite electrodes, which comprise electrochemically active components as well as electrochemically inactive components.

In principle, all materials that can absorb and release lithium ions can be used as electrochemically active components (active materials) for secondary lithium-ion cells. Carbon-based particles, such as graphitic carbon, are often used for the negative electrode. Other, non-graphitic carbon materials that are suitable for the intercalation of lithium can also be used. In addition, metallic and semi-metallic materials that are alloyable with lithium can also be used. For example, the elements tin, aluminum, antimony and silicon can form intermetallic phases with lithium. For example, lithium cobalt oxide ($LiCoO_2$), lithium manganese oxide ($LiMn_2O_4$), lithium iron phosphate ($LiFePO_4$) or derivatives thereof can be used as active materials for the positive electrode. The electrochemically active materials are generally contained in particle form in the electrodes.

As electrochemically inactive components, the composite electrodes generally comprise a flat and/or strip-shaped current collector, for example a metallic foil, which serves as a carrier for the respective active material. The current collector for the negative electrode (anode current collector) may be formed of copper or nickel, for example, and the current collector for the positive electrode (cathode current collector) may be formed of aluminum, for example. Furthermore, the electrodes can comprise an electrode binder (e.g., polyvinylidene fluoride (PVDF) or another polymer, for example, carboxymethyl cellulose), conductivity-enhancing additives, and other additives as electrochemically inactive components. The electrode binder ensures the mechanical stability of the electrodes and often the adhesion of the active material to the current collectors.

As electrolytes, lithium-ion cells generally comprise solutions of lithium salts such as lithium hexafluorophosphate ($LiPF_6$) in organic solvents (e.g., ethers and esters of carbonic acid).

In the manufacture of a lithium-ion cell, the composite electrodes are combined with one or more separators to form an assembly. In this process, the electrodes and separators are usually joined together under pressure, if necessary also by lamination or by bonding. The basic functionality of the cell can then be established by impregnating the assembly with the electrolyte.

In many embodiments, the assembly is formed as a winding or made into a winding. Generally, it comprises the sequence positive electrode/separator/negative electrode. Often, assemblies are made as so-called bicells with the possible sequences negative electrode/separator/positive electrode/separator/negative electrode or positive electrode/separator/negative electrode/separator/positive electrode.

For applications in the automotive sector, for e-bikes or also for other applications with high energy requirements such as in tools, lithium-ion cells with the highest possible energy density are needed that can simultaneously be loaded with high currents during charging and discharging.

Cells for the applications mentioned are often designed as cylindrical round cells, for example with the form factor 21×70 (diameter*height in mm) Cells of this type always comprise an assembly in the form of a winding. Modern lithium-ion cells of this form factor can already achieve an energy density of up to 270 Wh/kg. However, this energy density is only considered an intermediate step. The market is already demanding cells with even higher energy densities.

When developing improved electrochemical cells, however, there are other factors to consider than just energy density. Extremely important parameters are also the internal resistance of the cells, which should be kept as low as possible to reduce power losses during charging and discharging, and the thermal connection of the electrodes, which can be essential for temperature regulation of the cell. These parameters are also very important for cylindrical round cells that contain a composite assembly in the form of a winding. During fast charging of cells, heat accumulation can occur in the cells due to power losses, which can lead to massive thermomechanical stresses and subsequently to deformation and damage of the cell structure. The risk is amplified when the electrical connection of the current collectors is made via separate electrical conductor tabs welded to the current collectors, which protrude axially from wound assemblies, as heating can occur locally at these conductor tabs under heavy loads during charging or discharging.

WO 2017/215900 A1 describes cells in which the electrode-separator assembly and its electrodes are ribbon-shaped and are in the form of a winding. The electrodes each have current collectors loaded with electrode material.

Oppositely poled electrodes are arranged offset to each other within the electrode-separator assembly so that longitudinal edges of the current collectors of the positive electrodes protrude from the winding on one side and longitudinal edges of the current collectors of the negative electrodes protrude from the winding on another side. For electrical contacting of the current collectors, the cell has at least one contact element which rests on one of the longitudinal edges in such a way that a line-shaped contact zone is formed. The contact element is connected to the longitudinal edge along the line-shaped contact zone by welding. This makes it possible to electrically contact the current collector and thus also the associated electrode over his/her entire length. This significantly reduces the internal resistance within the cell described. The occurrence of large currents can subsequently be absorbed much better.

U.S. Pat. No. 6,432,574 B1 describes cylindrical round cells in which electrode-separator assemblies, also in the form of windings, are electrically contacted via contact sheet metal members welded onto the end faces. FIG. 2A shows a typical housing for accommodating such an electrode-separator assembly. It comprises a cup-shaped housing part in which a wound electrode-separator assembly is axially aligned. The housing is closed by means of a multi-part lid, on the edge of which an annular seal is fitted. To seal the housing, the terminal edge of the cup has been bent radially inward over the edge of the lid as well as the seal applied to it. To support this process, the circumferential deep groove immediately below the lid is required. During the sealing process, a tool engages in this groove so that axial pressure can be exerted on the edge of the lid and the seal when the terminal edge is bent over from above and below. As a result, the seal is compressed between the groove and the underside of the lid edge and between the bent edge of the cup and the top of the lid edge, resulting in an efficient seal. However, the groove required is disadvantageous. For one thing, it must be inserted into the housing in a separate step after the electrode-separator assembly has been inserted. For another, the groove imposes a dead volume that must be overcome by means of a current conductor in order to make electrical contact with the lid. In the case of the cell shown in FIG. 2A, an extra-long contact sheet metal member is welded onto the upper end face for this purpose, bent over and welded to the inside of the lid.

SUMMARY

In an embodiment, the present disclosure provides a lithium-ion cell. The lithium-ion cell includes a housing comprising a metallic tubular housing part made of aluminum or an aluminum alloy with a terminal circular opening. The cell further includes a contact element that closes the terminal circular opening of the tubular housing part, the contact element comprising a metal disk, a contact sheet metal member, a metal pole pin and an insulator. In addition, the cell includes an electrode-separator assembly having an anode, a cathode, and a separator with the sequence anode/separator/cathode. The electrode-separator assembly is in the form of a cylindrical winding with two terminal end faces and a winding shell located therebetween. The electrode-separator assembly is disposed in the winding and is axially aligned so that the winding shell abuts an inside of the tubular housing part.

The anode is ribbon-shaped and comprises a ribbon-shaped anode current collector made of nickel or copper or a nickel or copper alloy. The anode current collector comprises a first longitudinal edge and a second longitudinal edge and two ends. The anode current collector further comprises a strip-shaped main region loaded with a layer of negative electrode material and a free edge strip extending along the first longitudinal edge which is not loaded with the electrode material.

The cathode is ribbon-shaped and comprises a ribbon-shaped cathode current collector made of aluminum or an aluminum alloy. The cathode current collector comprises a first longitudinal edge and a second longitudinal edge and two ends. The cathode current collector further comprises a strip-shaped main region loaded with a layer of positive electrode material and a free edge strip extending along the first longitudinal edge which is not loaded with the electrode material.

The anode and the cathode are arranged within the electrode-separator assembly such that the first longitudinal edge of the anode current collector protrudes from one of the terminal end faces and the first longitudinal edge of the cathode current collector protrudes from the other of the terminal end faces.

The metal disk comprises aluminum or an aluminum alloy. The metal disk has a circular edge and is arranged in the tubular housing part such that the circular edge abuts the inside of the tubular housing part along a circumferential contact zone. The edge of the metal disk is connected to the tubular housing part by a circumferential weld seam.

The contact sheet metal member comprises nickel or copper or a nickel or copper alloy. The contact sheet metal member has two sides, one side facing in the direction of the metal disk and the other side being in direct contact with a respective longitudinal edge and is connected to the respective longitudinal edge by welding, the respective longitudinal edge being the first longitudinal edge of the anode current collector or the first longitudinal edge of the cathode current collector.

The pole pin is fixed to the contact sheet metal member and is led out of the housing of the cell through an opening in the metal disk. The insulator electrically insulates the pole pin and the contact sheet metal member against the metal disk.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
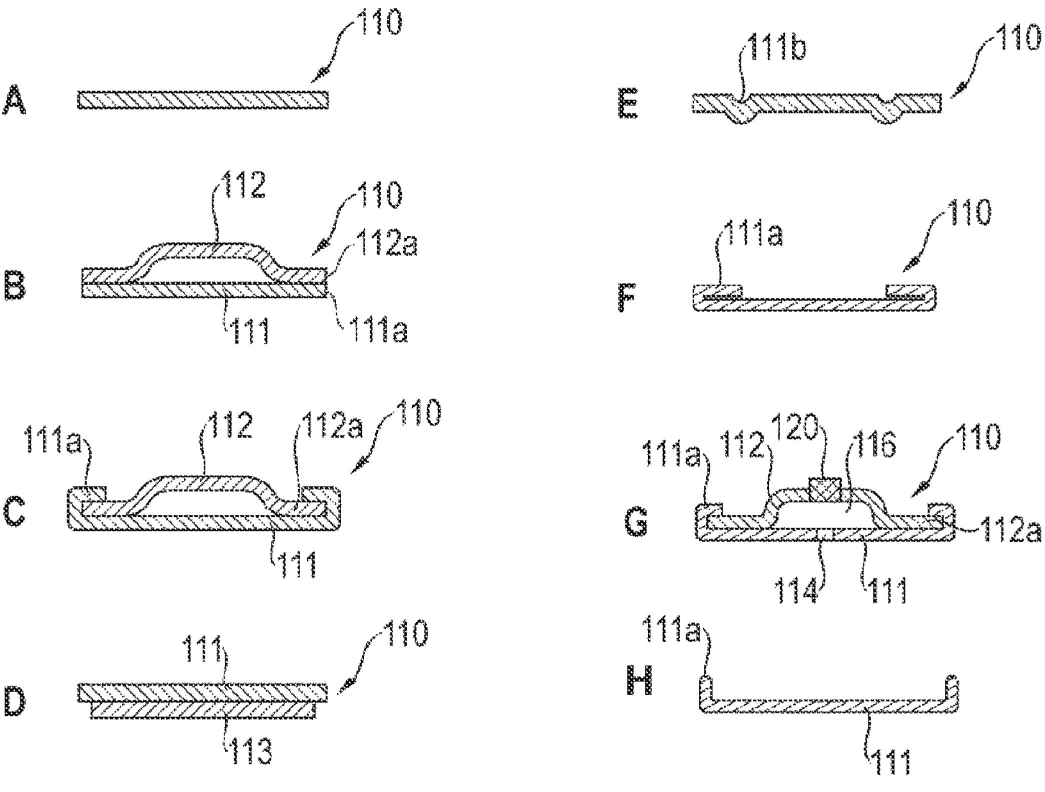
FIG. 1 illustrates various embodiments of a contact element of an energy storage cell (cross-sectional views)

The present disclosure provides energy storage cells characterized by an improved energy density compared to the prior art as well as a homogeneous current distribution as far as possible over the entire area and length of their electrodes and which at the same time have excellent characteristics with regard to their internal resistance and their passive heat dissipation capabilities. Furthermore, the cells should also be characterized by improved manufacturability and safety.

An energy storage cell according to a first aspect of the disclosure has the immediately following features a. to j.:

a. the cell comprises an electrode-separator assembly with the sequence anode/separator/cathode, b. the electrode-separator assembly is in the form of a cylindrical winding with two terminal end faces and a winding shell between them, c. the cell comprises a housing that comprises a metallic tubular housing part with a terminal circular opening, d. in the housing, the electrode-separator assembly formed as a winding is axially aligned so that the winding shell abuts the inside of the tubular housing part, e. the anode is ribbon-shaped and comprises a ribbon-shaped anode current collector having a first longitudinal edge and a second longitudinal edge and two ends, f. the anode current collector comprises a strip-shaped main region loaded with a layer of negative electrode material and a free edge strip extending along the first longitudinal edge which is not loaded with the electrode material, g. the cathode is ribbon-shaped and comprises a ribbon-shaped cathode current collector having a first longitudinal edge and a second longitudinal edge and two ends, h. the cathode current collector comprises a strip-shaped main region loaded with a layer of positive electrode material and a free edge strip extending along the first longitudinal edge which is not loaded with the electrode material, i. the anode and the cathode are arranged within the electrode-separator assembly such that the first longitudinal edge of the anode current collector protrudes from one of the terminal end faces and the first longitudinal edge of the cathode current collector protrudes from the other of the terminal end faces, j. the cell comprises an at least partially metallic contact element which is in direct contact with one of the first longitudinal edges and which is preferably connected to this longitudinal edge by welding,

Preferred Embodiments of the Electrochemical System

In principle, the disclosure contemplates energy storage cells regardless of their electrochemical embodiment. In preferred embodiments, however, the energy storage cell is a lithium-ion cell, in particular a secondary lithium-ion cell. Basically all electrode materials known for secondary lithium-ion cells can therefore be used for the anode and cathode of the energy storage cell.

Carbon-based particles such as graphitic carbon or non-graphitic carbon materials capable of intercalating lithium, preferably also in particle form, can be used as active materials in the negative electrode of an energy storage cell in the form of a lithium-ion cell. Alternatively or additionally, lithium titanate ($Li_4Ti_5O_{12}$) or a derivative thereof may be included in the negative electrode, preferably also in particulate form. Furthermore, the negative electrode may contain as active material at least one material selected from the group comprising silicon, aluminum, tin, antimony, or a compound or alloy of these materials capable of reversibly incorporating and removing lithium, for example silicon oxide, optionally in combination with carbon-based active materials. Tin, aluminum, antimony and silicon can form intermetallic phases with lithium. The capacity to absorb lithium exceeds that of graphite or comparable materials many times over, especially in the case of silicon. Furthermore, thin anodes made of metallic lithium are also possible.

For the positive electrode of an energy storage cell in the form of a lithium-ion cell, lithium metal oxide compounds and lithium metal phosphate compounds such as $LiCoO_2$ and $LiFePO_4$ are suitable active materials. Furthermore, lithium nickel manganese cobalt oxide (NMC) with the chemical formula $LiNi_xMn_yCozO_2$ (where x+y+z is typically 1) is particularly well suited, Lithium manganese spinel (LMO) with the chemical formula $LiMn_2O_4$, or lithium nickel cobalt alumina (NCA) with the chemical formula $LiNi_xCo_yAlzO_2$ (where x+y+z is typically 1). Derivatives thereof, for example lithium nickel manganese cobalt alumina (NMCA) with the chemical formula $Li_{1.11}(Ni_{0.40}Mn_{0.39}Co_{0.16}Al_{0.05})_{0.89}O_2$ or $Li_{1+x}$M-O compounds and/or mixtures of said materials can also be used. The cathodic active materials are also preferably used in particulate form.

In addition, the electrodes of an energy storage cell designed as a lithium-ion cell preferably contain an electrode binder and/or an additive to improve the electrical conductivity. The active materials are preferably embedded in a matrix of the electrode binder, with adjacent particles in the matrix preferably being in direct contact with one another. Conducting agents have the function of elevating the electrical conductivity of the electrodes. Common electrode binders are based, for example, on polyvinylidene fluoride (PVDF), polyacrylate or carboxymethyl cellulose. Common conductive agents are carbon black and metal powder.

The energy storage cell preferably comprises an electrolyte, in the case of a lithium-ion cell in particular an electrolyte based on at least one lithium salt such as lithium hexafluorophosphate ($LiPF_6$), which is present dissolved in an organic solvent (e.g. in a mixture of organic carbonates or a cyclic ether such as THF or a nitrile). Other lithium salts that can be used include lithium tetrafluoroborate ($LiBF_4$), lithium bis(trifluoromethanesulfonyl)imide (LiTFSI), lithium bis(fluorosulfonyl)imide (LiFSI), and lithium bis(oxalato)borate (LiBOB).

Preferred Embodiments of the Separator

The electrode-separator assembly preferably comprises at least one ribbon-shaped separator, more preferably two ribbon-shaped separators, each having first and second longitudinal edges and two ends.

Preferably, the separators are formed from electrically insulating plastic films. It is preferred that the separators can be penetrated by the electrolyte. For this purpose, the plastic films used can have micropores, for example. The foil can consist of a polyolefin or a polyetherketone, for example. Nonwovens and fabrics made of plastic materials or other electrically insulating sheet structures can also be used as separators. Preferably, separators are used that have a thickness in the range from 5 μm to 50 μm.

In some embodiments, the separator or separators of the assembly may also be one or more layers of a solid electrolyte.

Preferred Structure of the Electrode-Separator Assembly Formed as a Winding

The ribbon-shaped anode, the ribbon-shaped cathode and the ribbon-shaped separator(s) are preferably wound spirally in the electrode-separator assembly in the form of a winding. To produce the electrode-separator assembly, the ribbon-shaped electrodes are fed together with the ribbon-shaped separators to a winding device, in which they are preferably wound spirally around a winding axis. In some embodiments, the electrodes and the separators are wound for this purpose onto a cylindrical or hollow-cylindrical winding core, which is seated on a winding mandrel and remains in the winding after winding. The winding shell can be formed, for example, by a plastic film or an adhesive tape. It is also possible for the winding shell to be formed by one or more turns of the separator.

Preferred Embodiments of the Current Collectors

The current collectors of the energy storage cell have the function of electrically contacting electrochemically active components contained in the respective electrode material over as large an area as possible. Preferably, the current collectors consist of a metal or are at least metallized on the surface. In the case of an energy storage cell designed as a lithium-ion cell, suitable metals for the anode current collector are, for example, copper or nickel or other electrically conductive materials, in particular copper and nickel alloys or metals coated with nickel. Stainless steel is also generally a possibility. In the case of an energy storage cell designed as a lithium-ion cell, aluminum or other electrically conductive materials, including aluminum alloys, are particularly suitable as the metal for the cathode current collector.

Preferably, the anode current collector and/or the cathode current collector is each a metal foil having a thickness in the range from 4 μm to 30 μm, in particular a ribbon-shaped metal foil having a thickness in the range from 4 μm to 30 μm.

In addition to foils, however, other ribbon-shaped substrates such as metallic or metallized nonwovens or open-pore metallic foams or expanded metals can be used as current collectors.

The current collectors are preferably loaded on both sides with the respective electrode material.

It is preferred that the longitudinal edges of the separators form the end faces of the electrode-separator assembly formed as a winding.

It is further preferred that the longitudinal edges of the anode current collector and/or the cathode current collector protruding from the terminal end faces of the winding do not exceed 5000 μm, preferably not exceed 3500 μm.

Preferably, the edge or longitudinal edge of the anode current collector protrudes from the end face of the winding no more than 2500 μm, preferably no more than 1500 μm. Preferably, the edge or longitudinal edge of the cathode current collector protrudes from the end face of the winding no more than 3500 μm, preferably no more than 2500 μm.

In particular, the cell is characterized by the following two features k. and l.:

k. the contact element comprises a circular edge, l. the contact element closes the terminal circular opening of the tubular housing part.

In accordance with the disclosure, it is proposed to use a contact element with a circular edge and to close the terminal circular opening of the tubular housing part with the contact element. The contact element thus not only serves to make electrical contact with an electrode, but also functions as a housing part. This has a major advantage, as a separate electrical connection between the contact element and a housing part is no longer required. This creates space within the housing and simplifies cell assembly. In addition, direct connection of a housing part to the current collectors of a cell provides excellent heat dissipation properties.

Preferred Embodiments of the Contact Element/Electrical Connection of the Contact Element to the Electrode-Separator Assembly Formed as a Winding In a first preferred embodiment, the energy storage cell is characterized by at least one of the four immediately following features a. to d:

a. The contact element is or comprises a metal disk, the edge of which corresponds to or forms part of the circular edge of the contact element.

b. The metal disk is arranged in the tubular housing part in such a way that its edge abuts the inside of the tubular housing part along a circumferential contact zone.

c. The edge of the metal disc is connected to the tubular housing part by a circumferential weld seam.

d. One of the first longitudinal edges is connected to the metal disk by welding.

Preferably, all four immediately preceding features a. to d. are realized in combination with each other.

In the simplest embodiment, the metal disk is a flat sheet metal part with a circular circumference that extends in only one plane. In many cases, however, more elaborate designs may be preferred. For example, the metal disk may be profiled, for example having around its center one or more circular depressions and or elevations, preferably in concentric arrangement, which may result for example in an undulating cross-section. It is also possible for its inner surface to have one or more ridges. Furthermore, the disk may have an edge that is bent radially inward so that it has a double-layered edge region with, for example, a U-shaped cross-section.

The contact element can consist of several individual parts, including the metal disk, which do not necessarily all have to consist of metal. In a preferred embodiment, the contact element can comprise, for example, a profiled metallic pole cap with a circular circumference, which can be welded onto the metal disk and has approximately or exactly the same diameter as the metal disk, so that the edge of the metal disk and the edge of the pole cap together form the edge of the contact element. In a further embodiment, the edge of the pole cap may be enclosed by the aforementioned radially inwardly bent edge of the metal disk. In preferred embodiments, there may even be a clamp connection between the two individual parts.

To enable the edge of the metal disk to abut the inside of the tubular housing part along the circumferential contact zone, it is preferred that the tubular housing part has a circular cross section, at least in the section where the edge of the metal disk abuts. It is expedient that the section is hollow cylindrical for this purpose. The inner diameter of the tubular housing part in this section is correspondingly adapted to the outer diameter of the edge of the contact element, in particular to the outer diameter of the metal disk.

The welding of the edge of the metal disc to the tubular housing part can be carried out in particular by means of a laser. Alternatively, however, it is also possible to fix the metal disk by soldering or bonding.

A separate sealing element is not required for a circumferential weld seam. The metal disk and the tubular housing part are sealingly connected via the weld seam. In addition, the welded joint also ensures an almost resistance-free electrical connection between the metal disc and the tubular housing part.

In a second preferred embodiment, the energy storage cell is characterized by at least one of the five immediately following features a. to e:

a. The contact element is or comprises a metal disk, the edge of which corresponds to or forms part of the circular edge of the contact element.
b. The metal disk is arranged in the tubular housing part in such a way that its edge abuts the inside of the tubular housing part along a circumferential contact zone.
c. The edge of the metal disc is connected to the tubular housing part by a circumferential weld seam.
d. The contact element comprises a metallic contact sheet metal member with two sides, one of which points in the direction of the metal disk and is preferably connected to the metal disk by welding.
e. One of the first longitudinal edges abuts directly against the other side of the contact sheet metal member and is preferably joined to it by welding.

Preferably, all five immediately preceding features a. to e. are realized in combination with each other.

With regard to some features, the second preferred embodiment does not differ from the first, for example in the scope of features a. to c.. Consequently, no more need be said separately about these features. With regard to preferred embodiments of these features, reference is made to the above explanations in connection with the first preferred embodiment.

Here, too, the edge of the metal disc can be welded to the tubular housing part, in particular by means of a laser. Alternatively, however, it is also possible to fix the metal disk by soldering or bonding.

In contrast to the first preferred embodiment, however, the contact element comprises, in addition to the metal disk, the contact sheet metal member according to feature d. as a further component, whereby one of the first longitudinal edges does not abut directly against the metal disk but instead abuts directly against the contact sheet metal member. The metal disk serves to close the housing, while the contact sheet metal member contacts the longitudinal edge of the current collector.

In a simple embodiment, the contact sheet metal member is a flat sheet metal part that extends only in one plane; in other embodiments, it can also be a profiled sheet metal part. In particular, it is also possible for it to have one or more ridges or elongated depressions on the side in contact with the longitudinal edge.

The contact sheet metal member may have a circular circumference in some preferred embodiment embodiments, but this is by no means mandatory. In some cases, the contact sheet metal member may be a metal strip, for example, or may have a plurality of strip-shaped segments, such as in a star-shaped arrangement.

In some embodiments, a contact sheet metal member may be used that includes at least one slot and/or at least one perforation. These may have the function of counteracting deformation of the contact sheet metal member during the formation of a welded joint to the first longitudinal edge.

The side of the contact sheet metal member facing the metal disk is preferably designed in such a way that, in the event of direct contact of the contact sheet metal member with the metal disk, a two-dimensional contact surface is present, i.e. the contact sheet metal member and the metal disk lie flat on top of each other at least in some areas.

Preferably, the contact sheet metal member and the metal disk are in rigid, further preferably in rigid, direct contact with each other. In this case, they are preferably fixed to each other by welding or soldering.

In preferred embodiments, the contact sheet metal member is designed like the contact plates described in WO 2017/215900 A1.

In a third preferred embodiment, the energy storage cell is characterized by at least one of the immediately following features a. to g:

a. The contact element is or comprises a metal disk, the edge of which corresponds to or forms part of the circular edge of the contact element.
b. The metal disk is arranged in the tubular housing part in such a way that its edge abuts the inside of the tubular housing part along a circumferential contact zone.
c. The edge of the metal disc is connected to the tubular housing part by a circumferential weld seam.
d. The contact element comprises a metallic contact sheet metal member with two sides, one of which faces the metal disk.
e. The contact element comprises a pole pin (108) fixed to the contact sheet metal member and extending out of the housing of the cell through an aperture in the metal disc.
f. The contact element comprises at least one insulating means which electrically insulates the pole pin (108) and/or the contact sheet metal member from the metal disk.
g. One of the first longitudinal edges abuts directly against the other side of the contact sheet metal member and is preferably joined to it by welding.

Preferably, all immediately preceding features a. to g. are realized in combination with each other.

With regard to some features, the third preferred embodiment does not differ from the first and the second, for example in the scope of features a. to d.. It is therefore not necessary to elaborate separately on these features. With regard to preferred embodiments of features a. to c., reference is made to the above explanations in connection with the first preferred embodiment. With regard to preferred embodiments of feature d., in particular concerning possible embodiments of the contact sheet metal member, reference is made to the above explanations in connection with the second preferred embodiment.

Here, too, the edge of the metal disc can be welded to the tubular housing part, in particular by means of a laser. Alternatively, however, it is also possible to fix the metal disk by soldering or bonding.

In contrast to the second preferred embodiment, however, the contact element in the third embodiment comprises a pole pin as a further component. This is preferably fixed to the contact sheet metal member by welding or soldering. It is electrically insulated from the metal disk by means of the insulating material, which preferably also has a sealing function.

The insulating material can preferably be a conventional plastic seal, which should be chemically resistant to the electrolytes used in each case. Suitable sealing materials are known to the skilled person in the field of primary and secondary energy storage elements. In alternative preferred embodiments, glasses as well as ceramic and glass-ceramic masses can also be used as insulating materials.

Possible Preferred Embodiments Concerning the Welding of Longitudinal Edges to the Contact Sheet Metal Member or Metal Disk of the Contact Element In both the first and the second or third preferred variants, a longitudinal edge of a current collector is preferably connected to the contact element by welding, in one case directly to the metal disk of the contact element, in other cases to the contact sheet metal member. In the following, some contacting variants are presented, according to which the connection of the longitudinal edge to the contact sheet metal member or to the metal disk can be designed.

The concept of welding the edges of current collectors with contact elements is already known from WO 2017/215900 A1 or JP 2004-119330 A. This technology enables particularly high current carrying capacities and low internal resistance. With regard to methods for electrically connecting contact elements, in particular also disc-shaped contact elements, to the edges of current collectors, full reference is therefore made to the contents of WO 2017/215900 A1 and JP 2004-119330 A.

Preferably, one of the first longitudinal edges abuts directly along the length of the metal disk or, in some cases, the contact sheet metal member. This results in a line-shaped contact zone which, in the case of spirally wound electrodes, has a spiral shape. It is preferred that the longitudinal edge is connected as uniformly as possible to the metal disk or contact sheet metal member along this linear and preferably spiral contact zone by means of suitable welded joints. Preferably, this connection can be designed as follows:

- Contacting variant 1: The longitudinal edge of the current collector, which abuts directly against the metal disk or contact sheet metal member, is continuously connected to the metal disk or contact sheet metal member over its entire length by a weld seam.
- Contacting variant 2: The longitudinal edge of the current collector abutting directly against the metal disk or contact sheet metal member comprises one or more sections, each of which is continuously connected to the metal disk or contact sheet metal member over its entire length by a weld seam. Preferably, these sections have a minimum length of 5 mm, preferably 10 mm, preferably 20 mm.
- Contacting variant 3: The longitudinal edge of the current collector directly abutting the metal disk or contact sheet metal member is connected to the metal disk or contact sheet metal member via a plurality of point-shaped welded joints (so-called multi-pin connection).

Of course, among these three contacting variants, the second and the third can also be combined.

In a possible further development of the second contacting variant, the section or sections connected continuously to the metal disc or contact sheet metal member over their entire length extend over at least 25%, preferably over at least 50%, preferably over at least 75%, of the total length of the respective longitudinal edge.

It is preferred that the metal disk and/or contact sheet metal member are characterized by at least one of the immediately following features a. and b.:

- a. The metal disk and/or contact sheet metal member preferably has a thickness in the range from 50 μm to 600 μm, preferably in the range from 150 μm to 350 μm.
- b. The metal disc and/or contact sheet metal member consists of alloyed or unalloyed aluminum, alloyed or unalloyed titanium, alloyed or unalloyed nickel or alloyed or unalloyed copper, but also, if necessary, of stainless steel (for example of type 1.4303 or 1.4404) or nickel-plated steel.

It is preferred that the immediately preceding features a. and b. are realized in combination.

If the longitudinal edge which abuts directly against the metal disc or, in a case, directly against the contact sheet metal member, in particular is welded thereto, is the longitudinal edge of the anode current collector, the anode current collector and the metal disc or the anode current collector and the contact sheet metal member preferably both consist of the same material or at least of a chemically related material, for example of copper and a copper alloy. In the case of an energy storage cell designed as a lithium-ion cell, the material is preferably selected from the group comprising copper, nickel, titanium, alloys of these three elements, nickel-plated steel and stainless steel. In the case of a lithium titanate anode, however, the anode current collector and the metal disc or the anode current collector and the contact sheet metal member may also consist of aluminum.

If the longitudinal edge, which abuts directly against the metal disc or, in some cases, directly against the contact sheet metal member, in particular is welded thereto, is the longitudinal edge of the cathode current collector, the cathode current collector and the metal disc or the cathode current collector and the contact sheet metal member preferably both consist of the same material or at least of a chemically related material, for example of aluminum and of an aluminum alloy. This is preferably selected from the group comprising alloyed or unalloyed aluminum, titanium, titanium alloys and stainless steel (e.g. of type 1.4404).

If the contact element comprises both the metal disc and the contact sheet metal member, the contact sheet metal member and the metal disc also preferably both consist of the same material or at least a chemically related material from a material point of view. As it were, it preferably consists of the same material as the current collector abutting thereon or of a chemically related material.

When combined with the contact sheet metal member, in some preferred embodiments it consists of stainless steel, for example type 1.4303 or 1.4404.

Preferably, the energy storage cell, in the described embodiments of the first to third preferred variants, has at least one of the following two additional immediately following features a. and b:

- a. The tubular housing part comprises, in the axial direction, a central section in which the winding shell abuts against its inner side and a contact section in which the edge of the metal disk abuts against its inner side.

b. The tubular housing part comprises a circular edge that is bent radially inward over the edge of the contact element.

In accordance with the above explanations regarding the preferred embodiment of the tubular housing part in the region of the contact zone, the contact section is preferably cylindrical or more precisely hollow cylindrical. The same applies with regard to the design of the central section.

Housing Variant with Housing Cup

In a preferred embodiment, the energy storage cell always has at least one of the following additional immediately following features a. and b:

a. The tubular housing part (101) is part of a housing cup that comprises a circular bottom.
b. The other of the first longitudinal edges abuts directly against the bottom and is joined to the bottom preferably by welding.

Preferably, the immediately preceding features a. and b. are realized in combination.

The use of housing cups has been known for a long time in the construction of cell housings, for example from WO 2017/215900 A1 mentioned at the beginning. However, the direct connection of the longitudinal edges of a current collector to the bottom of a housing cup, as proposed here, is not known. This measure also makes it possible to dispense with a separate electrical conductor, now on the bottom side, and to use an axially extended wound electrode-separator assembly, thus helping to elevate the energy density of the cell and improve its heat dissipation properties.

It is therefore possible and preferred to couple the current collector edges of the positive and negative electrodes protruding from opposite end faces of an electrode-separator assembly formed as a winding directly to a housing part in each case, namely the bottom of the cup and the contact element described above, which functions as a closure element. The use of the available internal volume of the cell housing for active components thus approaches its theoretical optimum.

The housing cup, particularly in the region of its bottom, preferably has a thickness similar to that of the metal disk and/or the contact sheet metal member of the contact element, i.e. in particular a thickness in the range from 50 μm to 600 μm, preferably in the range from 150 μm to 350 μm.

In particular, if the cell is designed as a lithium-ion cell, the choice of material from which the housing cup or at least the bottom of the housing cup is made depends on whether the anode or the cathode current collector is connected to the bottom. Preferred materials are basically the same materials from which the current collectors themselves are made. Thus, the housing cup or the bottom of the housing cup may consist of the following materials:

Alloyed or unalloyed aluminum, alloyed or unalloyed titanium, alloyed or unalloyed nickel, alloyed or unalloyed copper, stainless steel (for example type 1.4303 or 1.4404), nickel-plated steel.

Furthermore, the housing may consist of multi-layered materials (clad materials), for example comprising a layer of steel and a layer of aluminum or copper. In these cases, the layer of aluminum or the layer of copper preferably forms the inside of the housing cup or the bottom of the housing cup, respectively.

In principle, it is also possible that—as in the case of the contact element—there is only an indirect connection between the longitudinal edge of the other of the first longitudinal edges and the bottom of the cup via a contact sheet metal member. In this case, there is preferably a welded connection between the longitudinal edge and the contact sheet metal member according to one of the three contacting variants described above, while the contact sheet metal member is preferably connected to the bottom by direct welding. The contact sheet metal member is preferably designed like its counterpart in the case of the contact element described above.

The coupling of the other of the first longitudinal edges to the bottom or to the contact sheet metal member basically follows the same design principles as in the case of the coupling of one of the first longitudinal edges to the contact element. Here, too, the longitudinal edge preferably abuts the bottom directly along its length so that a line-shaped contact zone results which, in the case of the spirally wound electrodes, has a spiral shape. It is also preferred here that the longitudinal edge is connected as uniformly as possible to the bottom or to the contact sheet metal member along this linear and preferably spiral contact zone by means of suitable welded joints. This connection is preferably designed according to one of the three contacting variants described above or a combination of these contacting variants, for example as a multi-pin connection.

Housing Variant with Two Lids

In another preferred embodiment, the energy storage cell always has at least one of the following three additional immediately following features a. to c:

a. The tubular housing part has a further terminal circular opening.
b. The cell comprises a closure element with a circular edge that closes this further terminal opening.
c. The closure element for the further terminal opening is or comprises a metal disc, the edge of which corresponds to or forms part of the circular edge of the metal closure element.

Preferably, the immediately preceding features a. to c. are realized in combination.

In this embodiment, the tubular housing part—together with a closure element-replaces a housing cup. The housing thus consists of three housing parts, one of which is tubular and the other two (the contact element and the closure element) close the terminals of the tubular part as a lid. In terms of production technology, this offers advantages because, unlike housing cups, no deep-drawing tools are required for the manufacture of tubular housing parts. In addition, direct connection of the other of the first longitudinal edges to the closure element results in basically the same advantages as the connection to the bottom of a housing cup described above.

In this embodiment, the tubular housing part is preferably cylindrical or hollow cylindrical. In analogy to the contact element described above, the closure element is, in the simplest embodiment, a metal disk with a circular circumference extending in one plane only, or alternatively a profiled metal disk having, for example, one or more circular depressions and/or elevations around its center, preferably in concentric arrangement, which may result, for example, in an undulating cross-section. Equally preferably, the inner surface of the closure element, in particular of the metal disc, may have one or more ridges. Furthermore, the closure element, in particular the metal disc, may also have an edge which is bent radially inwards so that it or they have a double-layered edge region with, for example, a U-shaped cross section.

In a further embodiment, the closure element, in particular the metal disc, may also have an edge that is bent through 90° so that it has an L-shaped cross-section.

With regard to the choice of material and the preferred thickness of the closure element, in particular the metal disk, reference can likewise be made to the above explanations concerning the metal disk of the contact element. The preferred features mentioned there also apply to the closure element.

In a further development of this preferred embodiment, the energy storage cell always has at least one of the immediately following features a. to c:

a. The metal disk is arranged in the tubular housing part in such a way that its edge abuts the inside of the tubular housing part along a circumferential contact zone.
b. The edge of the metal disc is connected to the tubular housing part by a circumferential weld seam.
c. The tubular housing part comprises a circular edge that is bent radially inward over the edge of the closure element, in particular the edge of the metal disk.

Preferably, the immediately preceding features a. and b., and optionally also the immediately preceding features a. to c., are realized in combination.

According to this further development, it is therefore preferable to fix the closure element in the further terminal opening by welding. A separate sealing element is also not required here with a circumferential weld seam.

Radial bending of the edge of the closure element is an optional measure that is not required to fix the closure element, but may be expedient regardless.

In a further development, the energy storage cell according to the further preferred embodiment has one of the immediately following features a. to c:

a. The other of the first longitudinal edges abuts directly against the metal disk and is preferably joined to the metal disk by welding.
b. The other of the first longitudinal edges is welded to a contact sheet metal member that abuts directly against the metal disk.

In principle, it is also possible that—as in the case of the contact element—there is only an indirect connection via a contact sheet metal member between the longitudinal edge of the other of the first longitudinal edges and the metal disk or the closure element. In this case, there is preferably a connection by welding directly between the contact sheet metal member and the closure element, in particular the metal disk of the closure element. The contact sheet metal member is preferably designed like its counterpart in the case of the contact element described above. In particular, a side of the contact sheet metal member facing the metal disk of the closure element is in direct contact with the metal disk, so that a two-dimensional contact surface is present, i.e. the contact sheet metal member and the metal disk of the closure element lie flat on top of each other at least in some areas.

With regard to the choice of material and the preferred thickness of the contact sheet metal member, reference can also be made here to the above explanations on the contact sheet metal member of the contact element. The preferred features mentioned there also apply to the contact sheet metal member of the closure element.

The coupling of the other of the first longitudinal edges to the metal disk or the contact sheet metal member of the closure element basically follows the same design principles as in the case of the coupling of one of the first longitudinal edges to the contact element. Here, too, the longitudinal edge preferably abuts the metal disc or the contact sheet metal member directly along its length, resulting in a line-shaped contact zone which, in the case of the spirally wound electrodes, has a spiral course. Furthermore, it is also preferred here that along this linear and preferably spiral contact zone there is as uniform a connection as possible of the longitudinal edge to the metal disk or the contact sheet metal member of the closure element by means of suitable welded joints. This connection is preferably designed according to one of the three contacting variants described above or a combination of these contacting variants, for example as a multi-pin connection.

Preferred Embodiments of the Electrodes

In the free edge strips, the metal of the respective current collector is preferably free of the respective electrode material. In some preferred embodiments, the metal of the respective current collector is uncovered there so that it is available for electrical contacting, for example by welding.

In some further embodiments, however, the metal of the respective current collector in the free edge strips may also be coated, at least in some areas, with a support material that is more thermally resistant than the current collector coated therewith and that is different from the electrode material disposed on the respective current collector.

"Thermally more resistant" in this context is intended to mean that the support material retains its solid state at a temperature at which the metal of the current collector melts. It therefore either has a higher melting point than the metal or it sublimates or decomposes only at a temperature at which the metal has already melted.

The support material can in principle be a metal or a metal alloy, provided that this or these has a higher melting point than the metal from which the surface which is coated with the support material consists of. In many embodiments, however, the energy storage cell preferably has at least one of the additional immediately following features a. to d.:

a. The support material is a non-metallic material.
b. The support material is an electrically insulating material.
c. The non-metallic material is a ceramic material, a glass-ceramic material or a glass.
d. The ceramic material is aluminum oxide ($Al_2O_3$), titanium oxide ($TiO_2$), titanium nitride (TiN), titanium aluminum nitride (TiAlN), a silicon oxide, in particular silicon dioxide ($SiO_2$), or titanium carbonitride (TiCN).

The support material is preferably formed according to the immediately preceding feature b. and preferably according to the immediately preceding feature d.

The term non-metallic material comprises in particular plastics, glasses and ceramic materials.

The term "electrically insulating material" is to be understood broadly in this context. In principle, it comprises any electrically insulating material, in particular also said plastics.

The term ceramic material is to be understood broadly in this context. In particular, this includes carbides, nitrides, oxides, silicides or mixtures and derivatives of these compounds.

By the term "glass-ceramic material" is meant in particular a material comprising crystalline particles embedded in an amorphous glass phase.

The term "glass" basically means any inorganic glass that satisfies the thermal stability criteria defined above and that is chemically stable to any electrolyte that may be present in the cell.

Preferably, the anode current collector consists of copper or a copper alloy while at the same time the cathode current collector consists of aluminum or an aluminum alloy and the support material is aluminum oxide or titanium oxide.

It may be further preferred that free edge strips of the anode and/or cathode current collector are coated with a strip of the support material.

The main regions, in particular the strip-shaped main regions of the anode current collector and cathode current collector, preferably extend parallel to the respective edges or longitudinal edges of the current collectors. Preferably, the strip-shaped main regions extend over at least 90%, preferably over at least 95%, of the areas of the anode current collector and the cathode current collector.

In some preferred embodiments, the support material is applied immediately adjacent to the preferably strip-shaped main regions in the form of a strip or line, but does not completely cover the free regions in the process, so that immediately along the longitudinal edge the metal of the respective current collector is exposed.

Other Preferred Embodiments of the Energy Storage Cell

The energy storage cell may be a button cell. Button cells are cylindrical in shape and have a height that is less than their diameter. Preferably, the height is in the range from 4 mm to 15 mm. It is further preferred that the button cell has a diameter in the range from 5 mm to 25 mm. Button cells are suitable, for example, for supplying electrical energy to small electronic devices such as watches, hearing aids and wireless headphones.

The nominal capacity of a button cell in the form of a lithium-ion cell according to the disclosure is generally up to 1500 mAh. Preferably, the nominal capacity is in the range from 100 mAh to 1000 mAh, preferably in the range from 100 to 800 mAh.

Preferably, however, the energy storage cell according to the disclosure is a cylindrical round cell. Cylindrical round cells have a height that is greater than their diameter. They are particularly suitable for the applications mentioned at the beginning with high energy requirements, for example in the automotive sector or for e-bikes or for power tools.

Preferably, the height of energy storage cells designed as round cells is in the range from 15 mm to 150 mm. The diameter of the cylindrical round cells is preferably in the range from 10 mm to 60 mm. Within these regions, form factors of, for example, 18×65 (diameter*height in mm) or 21×70 (diameter*height in mm) are preferred. Cylindrical round cells with these form factors are particularly suitable for supplying power to electric drives in motor vehicles.

The nominal capacity of the cylindrical round cell according to the disclosure, designed as a lithium-ion cell, is preferably up to 90000 mAh. With the form factor of 21×70, the cell in one embodiment as a lithium-ion cell preferably has a nominal capacity in the range from 1500 mAh to 7000 mAh, preferably in the range from 3000 to 5500 mAh. With the form factor of 18×65, the cell in one embodiment as a lithium-ion cell preferably has a nominal capacity in the range from 1000 mAh to 5000 mAh, preferably in the range from 2000 to 4000 mAh.

In the European Union, manufacturers are strictly regulated in providing information on the nominal capacities of secondary batteries. For example, information on the nominal capacity of secondary nickel-cadmium batteries must be based on measurements according to the IEC/EN 61951-1 and IEC/EN 60622 standards, information on the nominal capacity of secondary nickel-metal hydride batteries must be based on measurements according to the IEC/EN 61951-2 standard, information on the nominal capacity of secondary lithium batteries must be based on measurements according to the IEC/EN 61960 standard, and information on the nominal capacity of secondary lead-acid batteries must be based on measurements according to the IEC/EN 61056-1 standard. Any information on nominal capacities in the present application is preferably also based on these standards.

The anode current collector, the cathode current collector and the separator are preferably ribbon-shaped in embodiments in which the cell is a cylindrical round cell and preferably have the following dimensions:

A length in the range of 0.5 m to 25 m

A width in the range of 30 mm to 145 mm

In these cases, the free edge strip extending along the first longitudinal edge, which is not loaded with the electrode material, preferably has a width of no more than 5000 μm.

In the case of a cylindrical round cell with the form factor 18×65, the current collectors preferably have a width of 56 mm to 62 mm, preferably 60 mm, and a length of not more than 2 m, preferably not more than 1.5 m.

In the case of a cylindrical round cell with the form factor 21×70, the current collectors preferably have a width of 56 mm to 68 mm, preferably 65 mm, and a length of not more than 3 m, preferably not more than 2.5 m.

Preferred Embodiment of the Cell

In the following, a preferred embodiment of the cell is described. In this preferred embodiment, the cell is characterized by the following combination of features:

a. The cell comprises an electrode-separator assembly with the sequence anode/separator/cathode, and b. the electrode-separator assembly is in the form of a cylindrical winding with two terminal end faces and a winding shell between them, and c. the cell comprises a housing comprising a metallic tubular housing part made of aluminum or an aluminum alloy having a terminal circular opening; and d. in the housing, the electrode-separator assembly formed as a winding is axially aligned so that the winding shell abuts the inside of the tubular housing part, and e. the anode is ribbon-shaped and comprises a ribbon-shaped anode current collector made of nickel or copper or a nickel or copper alloy having a first longitudinal edge and a second longitudinal edge and two ends; and f. the anode current collector comprises a strip-shaped main region loaded with a layer of negative electrode material and a free edge strip extending along the first longitudinal edge which is not loaded with the electrode material, and g. the cathode is ribbon-shaped and comprises a ribbon-shaped cathode current collector made of aluminum or an aluminum alloy having a first longitudinal edge and a second longitudinal edge and two ends; and h. the cathode current collector comprises a strip-shaped main region loaded with a layer of positive electrode material and a free edge strip extending along the first longitudinal edge which is not loaded with the electrode material, and i. the anode and the cathode are arranged within the electrode-separator assembly such that the first longitudinal edge of the anode current collector protrudes from one of the terminal end faces and the first longitudinal edge of the cathode current collector protrudes from the other of the terminal end faces, and j. the cell comprises a contact element which closes the terminal circular opening of the tubular housing part and which comprises a metal disc, a contact sheet metal member, a metal pole pin and an insulating means, and k. the metal disk consists of aluminum or an aluminum alloy, has a circular edge and is arranged in the tubular housing part in such a way that the edge abuts the inside of the tubular housing part along a circumferential contact zone, the edge of the metal disk being connected to the tubular housing part by a circumferential weld seam, and l. the contact sheet metal member consists of nickel or copper or a nickel or copper alloy and it has two sides, one of which faces in the direction of the metal disc and the other is in direct contact with one of the first longitudinal edges and is connected to this longitudinal edge by welding, and m. the pole pin is fixed to the contact sheet metal member and is led out of the housing of the cell through an aperture in the metal disc, and n. the insulating means electrically insulates the pole pin and the contact sheet metal member against the metal disk.

The electrode-separator assembly including all its components as well as many other of the components mentioned, such as the insulating means and the components of the contact element, have already been described in more detail above. Reference is hereby made to the corresponding explanations.

The metal disk of the contact element is an essential part of the housing of the cell, in addition to the tubular housing part; it closes the circular opening mentioned. All essential parts of the housing of this cell, the metallic tubular housing part and the metal disc, consist of aluminum or an aluminum alloy. The described preferred embodiment of the cell is thus preferably a cell with an aluminum housing.

In a preferred further development, the preferred embodiment of the cell is characterized by at least one of the following features a. to d.:

a. The pole pin is fixed to the contact sheet metal member by welding.

b. The pole pin is tubular in shape.

c. The pole pin consists of nickel or copper or nickel or copper alloy.

d. The pole pin consists of the same material as the contact sheet metal member.

Features a. to d. can be implemented independently of one another. Preferably, features a. and b., preferably features a. to c., further preferably features a. to d., are realized in combination with each other.

The tubular design of the pole pin is of great advantage in that it allows welding through the pole pin. This is particularly advantageous in the contact plate design described here, in which the contact sheet metal member is used for edge-to-edge contacting of a current collector edge. In this way, the contact sheet metal member can first be welded to an end face of the wound electrode-separator assembly. The pole pin can be welded to the contact sheet metal member in a later step, even if the winding together with the contact sheet metal member is already inserted into a housing. More on this below.

In a preferred further development, the preferred embodiment of the cell is characterized by at least one of the following features a. to e.:

a. The pole pin is tubular and fixed to the contact sheet metal member by welding.

b. The pole pin has a terminal segment consisting of nickel or copper or a nickel or copper alloy or having a sheath of nickel or copper or a nickel or copper alloy, in particular coated with the nickel or copper or nickel or copper alloy.

c. The terminal segment consisting of the nickel or the copper or the nickel or copper alloy or having the sheath of the nickel or the copper or the nickel or copper alloy is welded to the contact sheet metal member.

d. The pole pin has a terminal segment which consists of aluminum or an aluminum alloy or which has a sheath of aluminum or an aluminum alloy, in particular which is coated with the aluminum or the aluminum alloy.

e. The terminal segment, which consists of the aluminum or aluminum alloy or has the aluminum or aluminum alloy sheath, forms a terminal contact that can be tapped from outside the housing.

The feature groups a. to c. on the one side and d. and e. on the other side can in principle be implemented independently of one another. Preferably, therefore, features a. to c. and d. and e. are realized in combination with each other. Preferably, all features a. to e. are realized in combination with each other.

This embodiment offers the advantage that welding of the terminal pin to the contact sheet metal member is facilitated, since the same or similar materials can be welded together. If the terminal segment consists of copper, for example, it can be welded particularly well to a contact sheet metal member made of copper. The segment made of aluminum in turn ensures that contacting, in particular welding, to an aluminum arrester is easily possible outside the cell. The poles of several cells can be connected to each other via such an aluminum arrester.

If necessary, the housing of the cell can be filled with an electrolyte through the tubular pole pin.

In a preferred further development, the preferred embodiment of the cell is characterized by at least one of the following features a. to c.:

a. The tubular pole pin comprises a closed bottom at one of its ends.

b. The closed bottom is part of the terminal segment, which consists of the nickel or the copper or the nickel or copper alloy or has the sheath of the nickel or the copper or the nickel or copper alloy, and consists of the nickel or the copper or the nickel or copper alloy or has the sheath of the nickel or the copper or the nickel or copper alloy.

c. The bottom is welded to the contact sheet metal member.

Features a. to c. can be implemented independently of one another. Preferably, features a. to c. are implemented in combination with each other.

In this embodiment, the pole pin is cup-shaped, thus comprising said bottom and a circumferential side wall. In this embodiment, welding to the contact sheet metal member can also take place over a larger region, for example via a plurality of welding spots distributed over the bottom. When using the tubular pole pin with open end, on the other hand, welding can only take place where the opening of the pole pin abuts the contact sheet metal member.

Preferably, the tubular pole pin has the following dimensions:

A height in the range from 1 mm to 8 mm, preferably in the range from 2 mm to 4 mm.

An outer diameter in the range from 2 mm to 12 mm, preferably in the range from 3 mm to 8 mm.

An inside diameter in the range from 1 mm to 10 mm, preferably in the range from 2 mm to 6 mm.

A wall thickness in the range from 0.3 mm to 2.5 mm, preferably in the range from 0.3 mm to 1.5 mm.

In cases where the pole pin has a diameter that exceeds its height, it has in the embodiment with a bottom a cup-shaped form. In these cases, it could also be called a pole cup or a pole bowl.

In a preferred further development, the preferred embodiment of the cell is characterized by at least one of the following features a. and b.:

a. The tubular housing part is part of a housing cup of aluminum or an aluminum alloy that comprises a circular bottom.
b. The other of the first longitudinal edges abuts directly against the bottom and is joined to the bottom preferably by welding.

Preferably, features a. and b. are implemented in combination with each other.

Preferably, the aluminum housing of the preferred embodiment of the cell is thus composed of two essential parts, the housing cup made of aluminum or the aluminum alloy and the metal disk made of aluminum or the aluminum alloy, the bottom of the housing cup also serving for direct contacting of the longitudinal edge of one of the electrodes, analogously to the contact sheet metal member which is welded to the pole pin.

In a further preferred development, the preferred embodiment of the cell is characterized by at least one of the following features a. to c.:

a. The tubular housing part has a further terminal circular opening.
b. The cell comprises a closure element made of aluminum or an aluminum alloy with a circular edge that closes this further terminal opening and forms a bottom of the housing.
c. The closure element for the further terminal opening is or comprises a metal disc made of aluminum or an aluminum alloy, the edge of which corresponds to or forms part of the circular edge of the metal closure element.

Features a. to c. can be implemented independently of one another. Preferably, features a. to c. are implemented in combination with each other.

Preferably, the aluminum housing of the preferred embodiment of the cell can thus also be composed of three essential parts, the tubular housing part made of aluminum or the aluminum alloy, the metal disk made of aluminum or the aluminum alloy through which the pole pin is guided, and a closure element which comprises a further metal disk made of aluminum.

For clarification, when in the context of the present application reference is made to an aluminum alloy, this refers in preferred embodiments to an alloy comprising aluminum in a proportion of more than 75% by weight, preferably more than 85% by weight, in particular more than 95% by weight, preferably more than 98% by weight.

In preferred embodiments, when reference is made in the context of the present application to a copper alloy, this refers to an alloy which comprises copper in a proportion of more than 75% by weight, preferably more than 85% by weight, in particular more than 95% by weight, preferably more than 98% by weight.

When reference is made in the context of the present application to a nickel alloy, this refers in preferred embodiments to an alloy comprising nickel in a proportion of more than 75% by weight, preferably more than 85% by weight, in particular more than 95% by weight, preferably more than 98% by weight.

Manufacturing Process

According to a second aspect of the disclosure, a method of manufacturing an energy storage cell is characterized by the following steps:

a. Providing an electrode-separator assembly having the sequence anode/separator/cathode, which is in the form of a cylindrical winding having two terminal end faces and a winding shell therebetween, the electrodes each having a current collector coated with an electrode material and having a first longitudinal edge and a second longitudinal edge and two end faces, one of the longitudinal edges protruding from one of the terminal end faces,
b. Providing a tubular housing part having a terminal circular opening,
c. Providing an at least partially metallic contact element having a circular edge,
d. Welding of the one longitudinal edge protruding from the end face to the contact element or a metallic component of the contact element,
e. Inserting the electrode-separator assembly together with the contact element through the circular opening into the tubular housing part so that the winding shell abuts the inside of the tubular housing part and the edge of the contact element abuts the inside of the tubular housing part along a circumferential contact zone; and
f. Fixing the edge of the contact element to the inside of the tubular housing part.

The steps listed do not necessarily have to be performed in the specified order. For example, it is possible to swap the sequence of steps d. and e.

With regard to preferred embodiments of the electrode-separator assembly, the tubular housing part and the contact element as well as the welding of the longitudinal edge protruding from the end face, reference is made to the above explanations in connection with the energy storage cell.

In a preferred embodiment, the method is additionally characterized by at least one of the immediately following steps:

a. The fixing is done by means of welding, soldering or bonding.
b. After the fixing, the opening edge of the terminal circular opening is bent radially inward over the edge of the contact element.

In accordance with the above comments on the energy storage cell, fixing by means of welding is preferred. Bending over the edge is generally not necessary for sealing or closing. However, it may be required, for example, to calibrate the height of the energy storage cell.

Furthermore, in preferred embodiments, the method has at least one of the immediately following features a. and b:

a. The electrode-separator assembly is soaked with an electrolyte, the electrolyte being filled through an aperture provided for this purpose in the contact element or other housing part.
b. After filling the electrolyte, the aperture is closed, for example by bonding or welding.
c. The closure is carried out using an overpressure safety device.

Preferably, at least the immediately preceding steps a. and b., in some embodiments even the immediately preceding steps a. to c., are realized in combination.

To implement feature c., the closure of the aperture can be achieved, for example, by welding on a sheet of metal that comprises a bursting diaphragm, a bursting cross or a similar predetermined rupture point that can rupture in the event of a defined overpressure in the cell in order to prevent the cell from exploding.

Preferred Variant of the Method

A preferred variant of the method of manufacturing, which is particularly suitable for manufacturing the above-described preferred embodiment of the cell with the aluminum housing, is characterized by a combination of the following steps:

a. Providing an electrode-separator assembly having the sequence anode/separator/cathode, which is in the form of a cylindrical winding having two terminal ends and a winding shell therebetween, the electrodes each having a current collector coated with an electrode material and having a first longitudinal edge and a second longitudinal edge and two end faces, one of the longitudinal edges protruding from one of the terminal ends, and
b. Providing a tubular housing part made of aluminum or aluminum alloy having an inner surface and a terminal circular opening; and
c. Providing a metal disc made of aluminum or an aluminum alloy, a contact sheet metal member made of nickel or copper or a nickel or copper alloy, a metallic pole pin, and an insulating means, wherein the metal disc, the metallic pole pin, and the insulating means are provided in the form of a preassembled lid assembly in which the pole pin is passed through an aperture in the metal disc and is electrically insulated from the metal disc by the insulating means, and the contact sheet metal member is provided separately, and
d. Welding one of the longitudinal edges to the contact sheet metal member, and
e. Inserting the electrode-separator assembly together with the welded-on contact sheet metal member through the circular opening into the tubular housing part so that the winding shell abuts the inside of the tubular housing part and
f. placing the pre-assembled lid assembly in the tubular housing part such that the edge of the metal disc abuts the inside of the tubular housing part along a circumferential contact zone and one end of the pole pin is in contact with the contact sheet metal member, and
g. Fixing the edge of the metal disc to the inside of the tubular housing part by welding circumferentially, and
h. Weld the pole pin to the contact sheet metal member.

Before the edge of the metal disk is fixed by welding, in some embodiments of the method the electrode-separator assembly is filled with an electrolyte. However, this is also possible at a later stage of the method, for example through a hole in the metal disk, which is subsequently sealed.

The circumferential welding fixes the edge of the metal disc over its entire length to the inside of the tubular housing part. The aim is to achieve a liquid-tight connection between the two housing parts.

Here, too, reference is made to the fact that the electrode-separator assembly, including all its components, as well as many other components of the cell mentioned, such as the insulating means and the metal disk or contact sheet metal member, have already been described in more detail above. Reference is also made here to the corresponding explanations.

In a further development of the preferred variant of the method, the method is characterized by at least one of the following steps a. to c.:

a. The electrode-separator assembly is soaked with an electrolyte, the electrolyte being filled through an aperture provided for this purpose in the metal disk or other housing part.
b. After filling the electrolyte, the aperture (114) is closed, for example by bonding or welding or soldering.
c. The closure is performed using an overpressure safety device (120).

As already mentioned above, the electrolyte can also be filled in via the pole pin if necessary. The overpressure protection can, also as already mentioned, be a bursting diaphragm or a bursting cross, for example.

A development of the method described herein is defined in claim 11.

FIG. 1 provides cross-sectional views of various embodiments A to H of contact elements 110 suitable for sealing energy storage cells 100. In detail:

A Here is shown the simplest embodiment of a contact element 110, namely a flat metal disk with a circular circumference which extends in only one plane. The metal disk may consist of aluminum, for example.

B The contact element 110 shown here comprises the metal disk 111 and the metal pole cap 112. The metal disk 111 and the pole cap 112 each have a circular circumference and an identical diameter. While the metal disk 111 extends in only one plane, the pole cap 112 has a central bulge. The two parts 111 and 112 of the contact element 110 are preferably joined together by welding (not shown).

C The contact element 110 shown here comprises the metal disk 111 and the metal pole cap 112. The pole cap 112 is designed analogously to the pole cap in B. However, the edge 111*a* of the metal disk 111 is bent radially inward here so that the metal disk 111 has a U-shaped cross section in the edge region. The bent edge 111*a* encloses the edge 112*a* of the pole lid 112 and thus fixes the pole lid 112 to the metal disk 111. Notwithstanding this, it is preferred if the metal disk 111 and the pole lid 112 are additionally welded together.

D The contact element 110 shown here comprises the metal disk 111 and the contact sheet metal member 113. The contact sheet metal member 113 abuts flat against the metal disk 111 and is preferably welded to it. The metal disk 111 may consist of stainless steel, for example, and the contact sheet metal member 113 may consist of an aluminum alloy, for example.

E The contact element 110 shown here comprises only a metal disk. In contrast to the metal disk shown in A, this has a circular depression 111*b* on its upper side and a corresponding elevation on its lower side, i.e. it is profiled.

F The contact element 110 shown here comprises only a metal disk. In contrast to the metal disk shown in A, this has a radially inwardly folded edge 111*a* and consequently a double-layered edge region.

G The contact element 110 shown here comprises the metal disk 111 and the metal pole cap 112, which has a central curvature. The edge 111*a* of the metal disk 111 is bent radially inward so that the metal disk 111 has a U-shaped cross-section in the edge region. The bent-over edge 111*a* encloses the edge 112*a* of the pole cap 112 and thus fixes the pole cap 112 to the metal disk 111. Preferably, the edges 111*a* and 112*a* of the metal disk 111 and of the pole cap 112 are additionally connected to one another by welding (not shown). In the center of the metal disk 111 is found the hole 114, through which a cavity 116 is accessible, which is enclosed by the metal disk 111 and the pole lid 112. An overpressure protection device 120 is integrated into the pole lid 112, which can be triggered in the event of an overpressure in the cavity 116. In the simplest case, the overpressure protection 120 may be a predetermined cracking point.

H The contact element shown here comprises only one metal disk 111, which has an edge 111*a* with an L-shaped cross section that is bent over by 90°.

Closure elements, which can be used within the scope of the housing variant with two lids described above, can preferably also be designed according to embodiments A to H.

Figure 2:
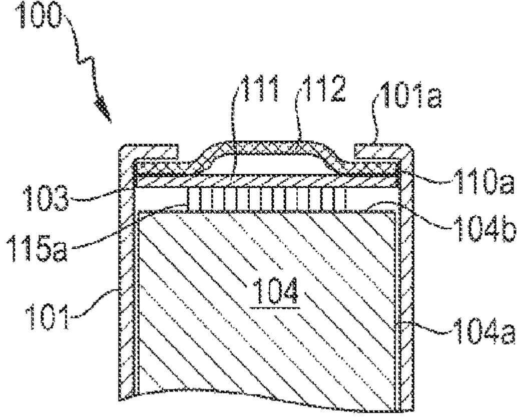
FIG. 2 provides a partial representation of an energy storage cell in accordance with a first preferred variant (cross-sectional view)

The energy storage cell 100 shown in FIG. 2 is an example of the first preferred embodiment described above. It comprises the contact element 110 shown in FIG. 1B, the edge 110*a* of which is formed by the edges 111*a* and 112*a* of the metal disk 111 and the metal pole cap 112. Together with the hollow-cylindrical metallic housing part 101, the contact element 110 forms the housing of the energy storage cell 100 and closes a terminal opening of the housing part 101. The edge 110*a* of the contact element abuts the inside 101*b* of the tubular housing part 101 along a circumferential contact zone and is connected to the tubular housing part 101 by a circumferential weld seam. The edge 101*a* of the housing part 101 is bent radially inwardly over the edge 110*a* of the contact element 110.

Inside the housing, the spirally wound electrode-separator assembly 104 is axially aligned so that its winding shell 104*a* abuts the inside of the tubular housing part 101. The longitudinal edge 115*a* of the anode current collector protrudes from the upper end face 104*b* of the electrode-separator assembly formed as a winding. This is welded directly to the underside of the metal disk 111, for example, via a multi-pin connection.

Figure 3:
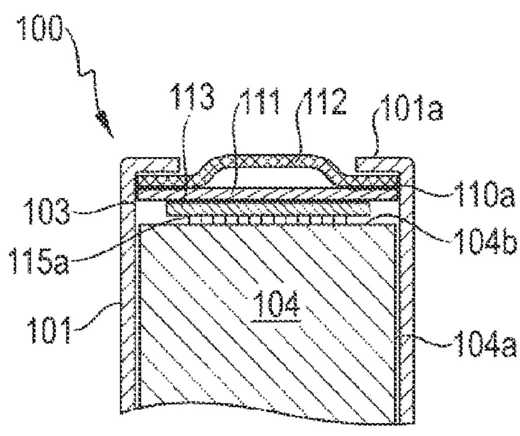
FIG. 3 provides a partial representation of an energy storage cell in accordance with a second preferred variant (cross-sectional view)

The energy storage cell 100 shown in FIG. 3 is an example of the second preferred embodiment described above. It comprises the contact element 110 shown in FIG. 1B, the edge 110*a* of which is formed by the edges 111*a* and 112*a* of the metal disk 111 and the pole cap 112. Together with the hollow-cylindrical metallic housing part 101, the contact element 110 forms the housing of the energy storage cell 100 and closes a terminal opening of the housing part 101. The edge 110*a* of the contact element abuts the inside 101*b* of the tubular housing part 101 along a circumferential contact zone and is connected to the tubular housing part 101 by a circumferential weld seam. The edge 101*a* of the housing part 101 is bent radially inwardly over the edge 110*a* of the contact element 110.

The contact element 110 further comprises a contact sheet metal member 113 having two sides, one of which faces the metal disk 111, even abuts flatly against it, and is connected to the metal disk 111 by welding.

In the housing, the spirally wound electrode-separator assembly 104 is axially aligned so that its winding shell 104*a* abuts the inside of the tubular metal housing part 101. The longitudinal edge 115*a* of the anode current collector protrudes from the upper end face 104*b* of the electrode-separator assembly formed as a winding. This abuts directly against the underside of the contact sheet metal member 113 and is welded to the underside of the contact sheet metal member 113, for example, via a multi-pin connection.

Figure 4:
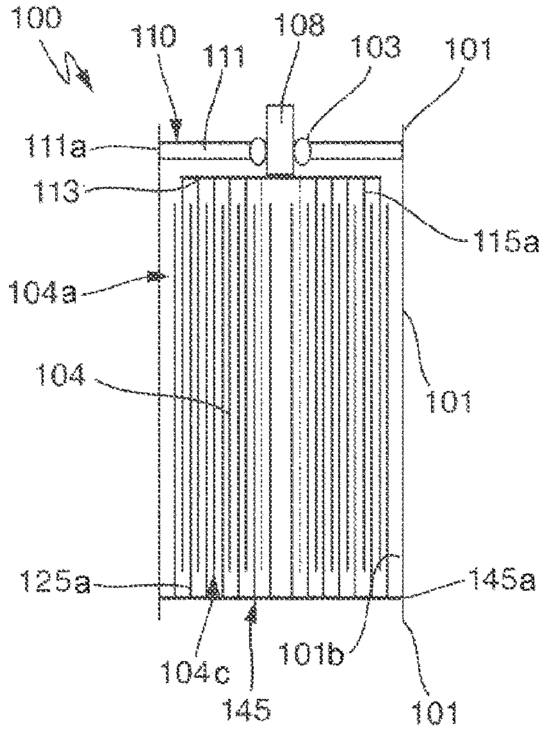
FIG. 4 provides a partial representation of an energy storage cell in accordance with a third preferred variant (cross-sectional view)

The energy storage cell 100 shown in FIG. 4 is an example of the third preferred embodiment described above. It comprises the electrode-separator assembly 104, which is axially inserted into the hollow-cylindrical housing part 101 so that its winding shell 104*a* abuts the inner surface 101*b* of the tubular housing part 101. The electrode-separator assembly 104 comprises a ribbon-shaped anode and a ribbon-shaped cathode wound spirally. The anode comprises a ribbon-shaped anode current collector and a ribbon-shaped cathode current collector. The anode current collector is loaded with a layer of negative electrode material. The cathode current collector is loaded with a layer of positive electrode material.

The longitudinal edge 115*a* of the anode current collector protrudes from the upper end face 104*b* of the electrode-separator assembly 104 formed as a winding. The longitudinal edge 125*a* of the cathode current collector protrudes from the lower end face 104*c* of the electrode-separator assembly 104 in the form of a winding.

The energy storage cell 100 comprises the tubular and hollow-cylindrical metal housing part 101, which has two terminal openings. The top opening is closed by the metal disk 111, which is arranged in the tubular housing part 101 in such a way that its edge 111*a* abuts the inside 101*b* of the tubular housing part 101 along a circumferential contact zone. The edge 111*a* of the metal disk 111 is connected to the tubular housing part 101 by a circumferential weld seam.

The metal disk 111 is part of a contact element 110, which comprises the contact sheet metal member 113 and the pole pin 108 in addition to the metal disk 111. The contact sheet metal member 113 comprises two sides, one of which, in the figure the upper side, points in the direction of the metal disk 111. The longitudinal edge 115*a* abuts directly against the other side of the contact sheet metal member 113, in this case the lower side. The longitudinal edge 115*a* is connected to the contact sheet metal member 113 by welding. The pole pin 108 is welded to the contact sheet metal member 113 and extends out of the housing of the cell 100 through a central aperture in the metal disk 111.

The contact element 110 further comprises the insulating means 103, which electrically insulates the pole pin 108 and thus also the contact sheet metal member 113 welded to the pole pin from the metal disk 111.

The bottom opening of the housing part 101 is closed by the closure element 145. The closure element 145 is a metal disk whose edge 145*a* abuts the inside 101*b* of the tubular housing part 101 along a circumferential contact zone. The edge 145*a* of the closure element 145 is connected to the tubular housing part 101 by a circumferential weld seam.

The longitudinal edge 125*a* of the cathode current collector abuts directly against the inner (upper) side of the contact sheet metal member 113. The longitudinal edge 125*a* is connected to the contact sheet metal member 113 by welding. The welding can be effected, for example, by means of a laser through the metal disc of the closure element 145.

Figure 5:
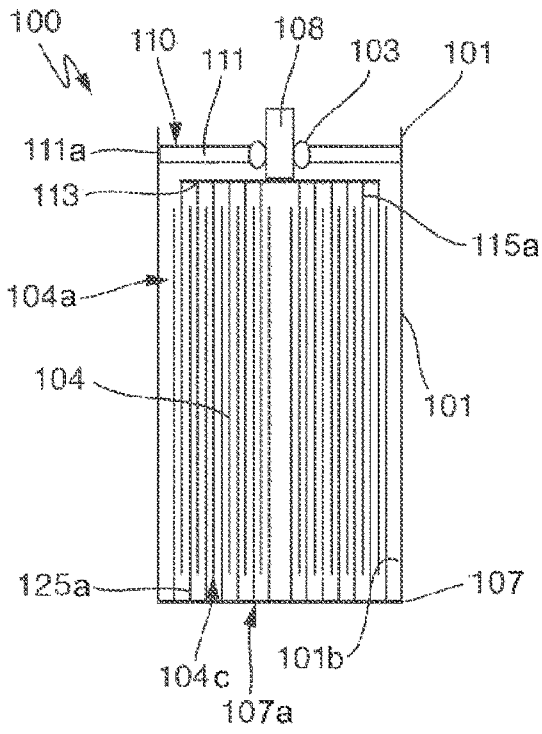
FIG. 5 provides a further partial representation of an energy storage cell in accordance with the third preferred variant (cross-sectional view)

The energy storage cell 100 shown in FIG. 5 is another example of the third preferred embodiment described above. It comprises the electrode-separator assembly 104, which is axially inserted into the hollow-cylindrical housing part 101 so that its winding shell 104*a* abuts the inner surface 101*b* of the tubular housing part 101. The electrode-separator assembly 104 comprises a ribbon-shaped anode and a ribbon-shaped cathode wound spirally. The anode comprises a ribbon-shaped anode current collector and a ribbon-shaped cathode current collector. The anode current collector is loaded with a layer of negative electrode material. The cathode current collector is loaded with a layer of positive electrode material.

The longitudinal edge 115*a* of the anode current collector protrudes from the upper end face 104*b* of the electrode-separator assembly 104 formed as a winding. The longitudinal edge 125*a* of the cathode current collector protrudes from the lower end face 104*c* of the electrode-separator assembly 104 in the form of a winding.

The energy storage cell 100 comprises the tubular and hollow cylindrical metallic housing part 101. The tubular housing part 101 is part of a metallic housing cup 107 which comprises a circular bottom 107*a*. The top opening of the housing cup 107 is closed by the metal disk 111, which is arranged in the tubular housing part 101 such that its edge 111*a* abuts the inner surface 101*b* of the tubular housing part 101 along a circumferential contact zone. The edge 111*a* of the metal disk 111 is connected to the tubular housing part 101 by a circumferential weld seam.

The metal disk 111 is part of a contact element 110, which comprises the contact sheet metal member 113 and the pole pin 108 in addition to the metal disk 111. The contact sheet metal member 113 comprises two sides, one of which, in the figure the upper side, points in the direction of the metal disk 111. The longitudinal edge 115*a* abuts directly against the other side of the contact sheet metal member 113, in this case the lower side. The longitudinal edge 115*a* is connected to the contact sheet metal member 113 by welding. The pole pin 108 is welded to the contact sheet metal member 113 and extends out of the housing of the cell 100 through a central aperture in the metal disk 111.

The contact element 110 further comprises the insulating means 103, which electrically insulates the pole pin 108 and thus also electrically insulates the contact sheet metal member 113 welded to the pole pin from the metal disk 111.

The lower end of the housing cup 107 terminates with the circular bottom 107*a*. The longitudinal edge 125*a* of the cathode current collector abuts directly against the inner side of the bottom 107*a*. The longitudinal edge 125*a* is joined to the bottom 107*a* by welding. The welding can be effected, for example, by welding through the bottom 107*a* by means of a laser.

Figure 6:
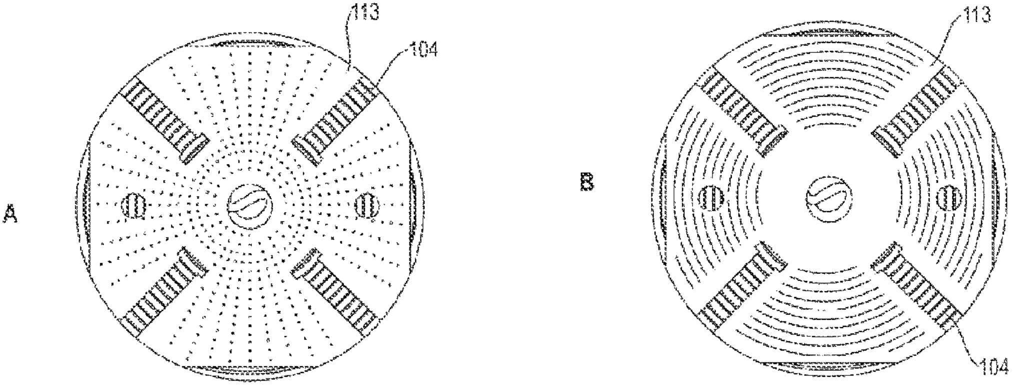
FIG. 6 provides an illustration of welded joints for connecting a longitudinal edge of a current collector to a contact sheet metal member of an energy storage cell (top view from above)

The examples shown in FIG. 6 illustrate contacting variants for connecting the longitudinal edges of current collectors with a spiral structure to a contact sheet metal member. In detail:

- A Here, a longitudinal edge of a current collector abuts directly against a contact sheet metal member and is connected to the contact sheet metal member via a plurality of point-shaped welded joints (so-called multi-pin connection).
- B Here, a longitudinal edge of a current collector abutting directly against a contact sheet metal member is fixed to the contact sheet metal member by a plurality of sections, each of which is continuously connected to the contact sheet metal member over its entire length by a weld seam.

Figure 7:
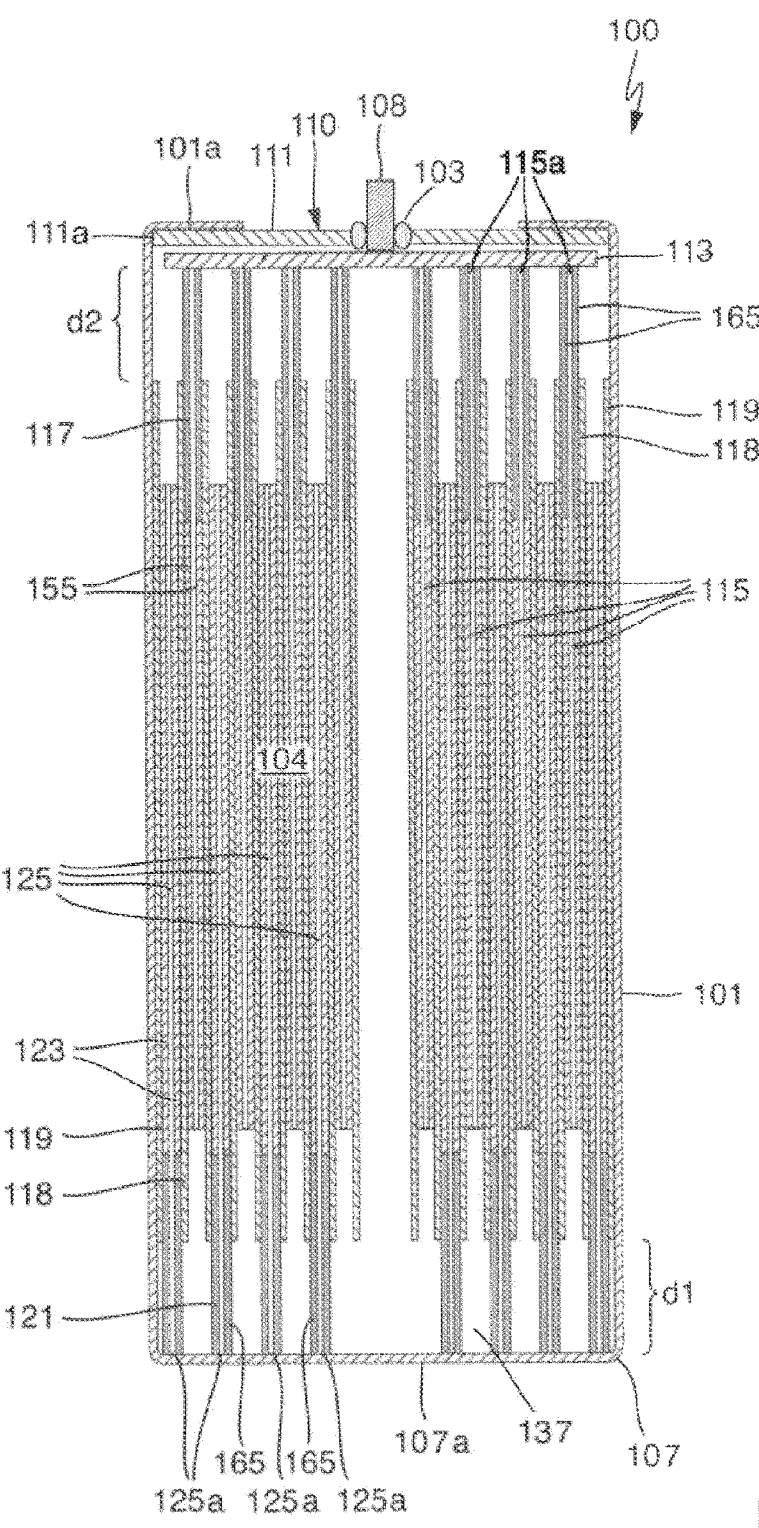
FIG. 7 illustrates a further preferred embodiment of an energy storage cell in accordance with the third preferred variant (cross-sectional view)

The energy storage cell 100 shown in FIG. 7 comprises a hollow cylindrical housing part 101 that is part of the housing cup 107, which comprises the circular bottom 107*a* and a circular opening (defined by the edge 101*a*). The housing cup 107 is a deep-drawn part. The housing cup 107, together with the contact element 110 comprising the flat metal disk 111 having the circular edge 111*a*, encloses an interior space 137 in which the electrode-separator assembly 104 formed as a winding is axially aligned. The metal disk 111 is arranged in the tubular housing part 101 such that its edge 111*a* abuts the inner surface 101*b* of the tubular housing part 101 along a circumferential contact zone. Its edge 111*a* corresponds to the edge of the contact element and is connected to the tubular housing part 101 by a circumferential weld seam. The edge 101*a* of the tubular housing part 101 is bent radially (here by about 90°) inwards over the edge 110*a* of the contact element 110.

The electrode-separator assembly 104 has the form of a cylindrical winding with two terminal end faces, between which the circumferential winding shell extends, abutting the inside of the hollow-cylindrical housing part 101. It is formed of a positive electrode and a negative electrode and separators 118 and 119, each of which is ribbon-shaped and spirally wound. The two end faces of the electrode-separator assembly 104 are formed by the longitudinal edges of the separators 118 and 119. The current collectors 115 and 125 protrude from these end faces. The corresponding protrusions are labeled d1 and d2.

The anode current collector 115 protrudes from the upper end face of the electrode-separator assembly 104, and the cathode current collector 125 protrudes from the lower end face. The anode current collector 115 is loaded in a ribbon-shaped main region with a layer of a negative electrode material 155. The cathode current collector 125 is loaded in a strip-shaped main region with a layer of a positive electrode material 123. The anode current collector 115 has an edge strip 117 extending along its longitudinal edge 115*a*, which is not loaded with the electrode material 155. Instead, a coating 165 of a ceramic support material is applied here to stabilize the current collector in this region. The cathode current collector 125 has an edge strip 121 extending along its longitudinal edge 125*a*, which is not loaded with the electrode material 123. Instead, the coating 165 of the ceramic support material is applied here as well.

In addition to the metal disk 111, the contact element 110 further comprises the contact sheet metal member 113 and the pole pin 108. The contact sheet metal member 113 comprises two sides, one of which, in the figure the upper side, points in the direction of the metal disk 111. On the other side of the contact sheet metal member 113, in this case the lower side, the longitudinal edge 115*a* is in direct contact with the contact sheet metal member 113 and thus with the contact element 110 over its entire length and is connected to the latter by welding over at least several sections, preferably over its entire length. Alternatively, the multi-pin connection described above may be present here. The contact element 110 thus serves simultaneously for electrical contacting of the anode and as a housing part.

The pole pin 108 is welded to the contact sheet metal member 113 and extends out of the housing of the cell 100 through a central aperture in the metal disk 111. The contact element 110 further comprises the insulating means 103, which electrically insulates the pole pin 108 and thus also the contact sheet metal member 113 welded to the pole pin from the metal disk 111. Only the metal disk 111 is in direct contact with, and thus also in electrical contact with, the housing cup 107. The pole pin 108 and the contact sheet metal member 113 are insulated from the housing cup.

The edge 125*a* of the cathode current collector 125 is in direct contact with the bottom 107*a* over its entire length and is connected to the latter by welding (in particular with the aid of a laser) over at least several sections, preferably over its entire length. Alternatively, the multi-pin connection described above may also be present here. The bottom 107*a* thus serves not only as part of the housing but also for electrical contacting of the cathode.

Figure 8:
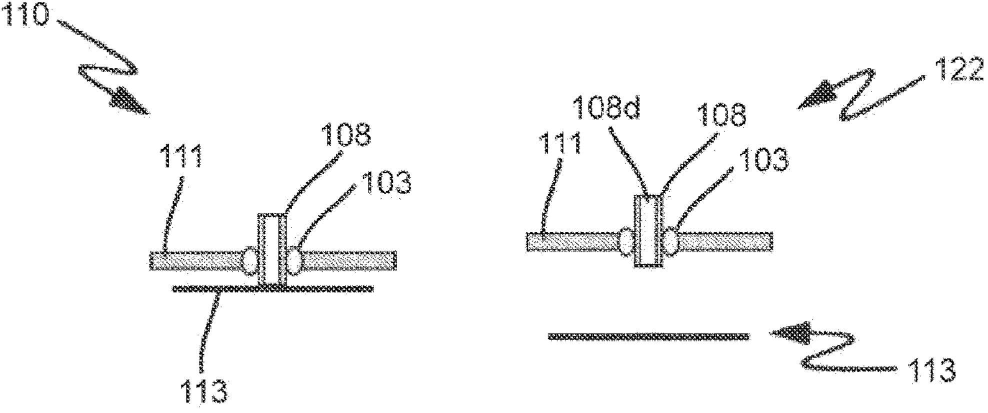
FIG. 8 illustrates an embodiment of a pre-assembled lid assembly and contact element that can be used to close a housing of a cell according to FIG. 4, FIG. 5 and FIG. 7.

FIG. 8 shows a contact element 110 as used for closing a housing of a cell according to FIG. 4, FIG. 5 and FIG. 7. The contact element comprises the metal disk 111, the contact sheet metal member 113, the metal pole pin 108 and the insulating means 103. For assembly of the cells according to FIGS. 4, 5 and 7, the contact sheet metal member 113 provided separately is preferably welded to the longitudinal edge 115*a*. After inserting the electrode-separator assembly 104 together with the welded contact sheet metal member 113 into the housing part 101, the pre-assembled lid assembly 122 is arranged in the housing part 101 so that the edge of the metal disk 111 abuts the inside of the housing part 101 along a circumferential contact zone and one end of the pole pin 108 is in contact with the contact sheet metal member 113. Then, the edge of the metal disk 111 can be welded to the inside of the housing part 101 and the pole pin 108 can be welded to the contact sheet metal member 113. Welding of the pole pin 108 is facilitated by the fact that it is tubular in shape. The pole pin 108 has a central aperture 108*d* for this purpose.

Figure 9:
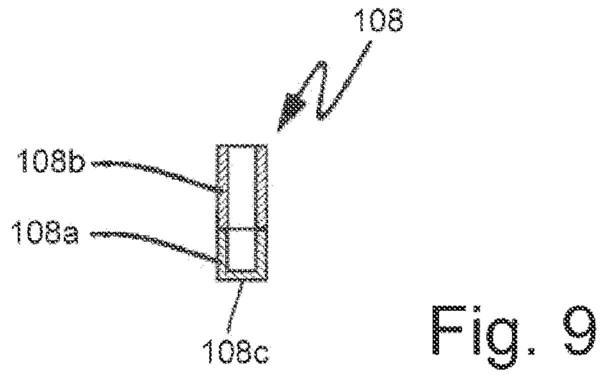
FIG. 9 illustrates an embodiment of a pole pin.

FIG. 9 illustrates a preferred embodiment of a pole pin 108. The pole pin 108 is tubular and has a terminal segment 108*a* consisting of nickel or copper or a nickel or copper alloy, or having a sheath of nickel or copper or a nickel or copper alloy, for example coated with the nickel or copper or nickel or copper alloy. Another terminal segment 108*b* of the pole pin 108 consists of aluminum or an aluminum alloy or has a sheath of aluminum or an aluminum alloy, for example, is coated with the aluminum or the aluminum alloy. The segment 108*a* can be excellently welded to the contact sheet metal member 113, in particular if the latter consists of the same material as the segment 108*a*. In the fully assembled cell, the terminal segment 108*b* forms a terminal contact that can be tapped from outside the housing. In particular, the terminal segment 108*b* can be well welded to an arrester made of aluminum or an aluminum alloy.

In contrast to the pole pin shown in FIG. 8, the pole pin 108 shown in FIG. 9 comprises a closed bottom 108*c*. This is part of the terminal segment 108*a* and also consists of nickel or copper or the nickel or copper alloy or has said sheath of nickel or the or the nickel or copper alloy. The bottom 108*c* can be particularly easily welded to the contact sheet metal member 113.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A lithium-ion cell, comprising:

a housing comprising a metallic tubular housing part made of aluminum or an aluminum alloy with a terminal circular opening;

a contact element that closes the terminal circular opening of the tubular housing part, the contact element comprising a metal disk, a contact sheet metal member, a tubular metal pole pin, and an insulator, and an electrode-separator assembly having an anode, a cathode, and a separator with the sequence anode/separator/cathode, wherein the electrode-separator assembly is in the form of a cylindrical winding with two terminal end faces and a winding shell located therebetween, wherein the electrode-separator assembly is disposed and is axially aligned so that the winding shell abuts an inside of the tubular housing part, wherein the anode is ribbon-shaped and comprises a ribbon-shaped anode current collector made of nickel or copper or a nickel or copper alloy, wherein the anode current collector comprises a first longitudinal edge and a second longitudinal edge and two ends, wherein the anode current collector further comprises a strip-shaped main region loaded with a layer of negative electrode material and a free edge strip extending along the first longitudinal edge which is not loaded with the negative electrode material, wherein the cathode is ribbon-shaped and comprises a ribbon-shaped cathode current collector made of aluminum or an aluminum alloy, wherein the cathode current collector comprises a first longitudinal edge and a second longitudinal edge and two ends, wherein the cathode current collector further comprises a strip-shaped main region loaded with a layer of positive electrode material and a free edge strip extending along the first longitudinal edge which is not loaded with the positive electrode material, wherein the anode and the cathode are arranged within the electrode-separator assembly such that the first longitudinal edge of the anode current collector protrudes from one of the terminal end faces and the first longitudinal edge of the cathode current collector protrudes from the other of the terminal end faces, wherein the metal disk comprises aluminum or an aluminum alloy, wherein the metal disk has a circular edge and is arranged in the tubular housing part such that the circular edge abuts the inside of the tubular housing part along a circumferential contact zone, and wherein the edge of the metal disk is connected to the tubular housing part by a circumferential weld seam, wherein the contact sheet metal member comprises nickel or copper or a nickel or copper alloy, wherein the contact sheet metal member has two sides, one side facing in the direction of the metal disk and the other side being in direct contact with a respective longitudinal edge and is connected to the respective longitudinal edge by welding, the respective longitudinal edge being the first longitudinal edge of the anode current collector or the first longitudinal edge of the cathode current collector, wherein the tubular metal pole pin is welded to the contact sheet metal member and is led out of the housing of the cell through an opening in the metal disk, and wherein the insulator electrically insulates the pole pin and the contact sheet metal member against the metal disk.

2. The cell of claim 1, wherein at least one of:

the tubular metal pole pin comprises nickel or copper or a nickel or copper alloy; and/or the tubular metal pole pin comprises the same material as the contact sheet metal member.

3. The cell of claim 1, wherein at least one of:

the tubular metal pole pin has a terminal segment comprising nickel or copper or a nickel or copper alloy;

the tubular metal pole pin has a sheath of nickel or copper or a nickel or copper alloy;

the tubular metal pole pin is coated with nickel or copper or the nickel or copper alloy;

the terminal segment is welded to the contact sheet metal member;

the tubular metal pole pin has a terminal segment comprising aluminum or an aluminum alloy;

the tubular metal pole pin has a sheath of aluminum or an aluminum alloy;

the tubular metal pole pin is coated with the aluminum or aluminum alloy; and/or the terminal segment forms a connection contact configured to be tapped from outside the housing.

4. The cell according to claim 2, wherein at least one of:

the tubular metal pole pin comprises a closed bottom at one of its ends;

the closed bottom of the tubular metal pole pin is part of the terminal segment and comprises a shell made of the nickel or copper or nickel or copper alloy; and/or the closed bottom is welded to the contact sheet metal member.

5. The cell according to claim 2, wherein at least one of:

the tubular housing part comprises, in the axial direction, a central portion in which the winding shell abuts against its inner side, and a contact portion in which the edge of the metal disk abuts against its inner side; and/or the tubular housing part comprises a circular edge that is bent radially inward over the edge of the contact element.

6. The cell according to claim 1, wherein at least one of:

the tubular housing part is part of an aluminum housing cup or an aluminum alloy housing cup that comprises a circular bottom; and/or a second respective longitudinal edge abuts directly against the circular bottom and is joined to the bottom.

7. The cell according to claim 1, wherein at least one of:

the tubular housing part has a second terminal circular opening;

the cell further comprises a closure element comprising aluminum or aluminum alloy with a circular edge configured to close the second terminal opening and forming a bottom of the housing; and/or the closure element for the second terminal opening is or comprises a second metal disk made of aluminum or an aluminum alloy, an edge of the second metal disk corresponding to or forming part of the circular edge of the closure element.

8. The cell according to claim 7, wherein at least one of:

the second metal disk is arranged in the tubular housing part such that an edge of the second metal disk abuts the inner surface of the tubular housing part along a circumferential contact zone;

the edge of the second metal disk is connected to the tubular housing part by a circumferential weld seam; and/or the tubular housing part comprises a circular edge that is bent radially inward over the edge of the closure element.

9. The cell according to claim 8 wherein at least one of:

a second respective longitudinal edge abuts directly against the second metal disk; and/or the second respective longitudinal edge is welded to an aluminum or aluminum alloy contact sheet metal member that abuts directly against the second metal disk forming the bottom of the housing.

10. The cell according to claim 1, wherein the tubular metal pole pin comprises a closed bottom and a cavity extending from the closed bottom to an exterior of the cell, wherein the closed bottom is welded to a first side of the contact sheet metal member and wherein a second side of the contact sheet metal member is welded to the respective longitudinal edge.

11. A method for manufacturing an energy storage cell according to claim 1, the method comprising:

providing the electrode-separator assembly having the anode/separator/cathode sequence, providing the tubular housing part made of aluminum or an aluminum alloy, providing the metal disk made of aluminum or an aluminum alloy, the contact sheet metal member made of nickel or copper or a nickel or copper alloy, the metal pole pin, and the insulator, wherein the metal disk, the metal pole pin and the insulating means are provided in the form of a preassembled lid assembly, in which the pole pin is guided through the aperture in the metal disk and is electrically insulated from the metal disk by the insulator, and wherein the contact sheet metal member is provided separately, welding the respective longitudinal edge to the contact sheet metal member, inserting the electrode-separator assembly, together with the welded-on contact sheet metal member, through the circular opening into the tubular housing part so that the winding shell abuts against the inside of the tubular housing part, and arranging the pre-assembled lid assembly in the tubular housing part such that the edge of the metal disc abuts the inside of the tubular housing part along the circumferential contact zone and one end of the pole pin is in contact with the contact sheet metal member, and fixing the edge of the metal disk to the inside of the tubular housing part by welding in a circumferential manner, and welding the pole pin to the contact sheet metal member.

12. The method according to claim 11, further comprising:

bending the opening edge of the terminal circular opening radially inward over the edge of the metal disk.

13. The method according to claim 11, further comprising at least one of:

soaking the electrode-separator assembly with an electrolyte, the electrolyte being introduced through an aperture in the metal disk or another housing part;

after filling the electrolyte, closing the aperture; and/or performing the closure by using an overpressure safety device.

* * * * *